US009796475B2

(12) United States Patent
Saada et al.

(10) Patent No.: US 9,796,475 B2
(45) Date of Patent: Oct. 24, 2017

(54) VEHICLE SEAT BACKREST HAVING A WEAKENED AREA THAT IS ABLE TO TEAR

(71) Applicant: Expliseat, Paris (FR)

(72) Inventors: Benjamin Jacob Saada, Paris (FR); Jean-Charles Marcel Samuelian, Paris (FR); Vincent Tejedor, Issy les Moulineaux (FR)

(73) Assignee: EXPLISEAT, Paris (FR)

( * ) Notice: Subject to any disclaimer, the term of this patent is extended or adjusted under 35 U.S.C. 154(b) by 0 days.

(21) Appl. No.: 14/779,760

(22) PCT Filed: Mar. 25, 2014

(86) PCT No.: PCT/EP2014/055921
§ 371 (c)(1),
(2) Date: Sep. 24, 2015

(87) PCT Pub. No.: WO2014/154667
PCT Pub. Date: Oct. 2, 2014

(65) Prior Publication Data
US 2016/0046379 A1  Feb. 18, 2016

(30) Foreign Application Priority Data
Mar. 26, 2013 (FR) ....................................... 13 52712

(51) Int. Cl.
*B64D 11/06* (2006.01)
*B60N 2/58* (2006.01)
(Continued)

(52) U.S. Cl.
CPC ........ *B64D 11/0619* (2014.12); *B60N 2/4221* (2013.01); *B60N 2/42709* (2013.01);
(Continued)

(58) Field of Classification Search
CPC ............ B64D 11/0619; B64D 11/0647; B64D 11/0649; B60N 2/4221; B60N 2/42781;
(Continued)

(56) References Cited

U.S. PATENT DOCUMENTS 5,338,098 A * 8/1994 Ohnishi ............... B60N 2/5825
297/452.6
7,077,472 B2 * 7/2006 Steffens, Jr. ....... B60N 2/42781
297/216.12
(Continued)

FOREIGN PATENT DOCUMENTS

DE  10 2012 011 431 A1  12/2012
EP       1 719 701 A1  11/2006
(Continued)

OTHER PUBLICATIONS

Search Report issued in French Patent Application No. FR 13 52712 dated Nov. 25, 2013.
(Continued)

*Primary Examiner* — Beth Stephan
(74) *Attorney, Agent, or Firm* — Pearne & Gordon, LLP

(57) ABSTRACT

The vehicle seat back according to the invention includes a textile assembly (30) having at least one embrittled linear zone (32, 32A, 32B) able to tear during an impact of the head of a passenger located on the seat behind the seat back considered, so as to enable rocking of this passenger's head to be continued and, at the same time, to be slowed down. Application to aircraft seats.

11 Claims, 4 Drawing Sheets

(51) Int. Cl.
  *B60N 2/68* (2006.01)
  *B60N 2/70* (2006.01)
  *B60N 2/42* (2006.01)
  *B60N 2/427* (2006.01)

(52) U.S. Cl.
  CPC ........... *B60N 2/42781* (2013.01); *B60N 2/58* (2013.01); *B60N 2/68* (2013.01); *B60N 2/70* (2013.01); *B64D 11/0647* (2014.12); *B64D 11/0649* (2014.12); *Y02T 50/46* (2013.01)

(58) Field of Classification Search
  CPC ... B60N 2/58; B60N 2/68; B60N 2/70; B60N 2/42709; B60N 2/42745; B60N 2/427; B60N 2/5841; B60N 2/5825; B60N 2/64; B60R 22/28; B60R 2022/286; B60R 2022/283
  See application file for complete search history.

(56) References Cited

U.S. PATENT DOCUMENTS

| | | | | |
|---|---|---|---|---|
| 7,309,103 | B2* | 12/2007 | Nelson | B60N 2/42709 297/216.13 |
| 7,748,507 | B2* | 7/2010 | Canot | B62D 21/152 188/377 |
| 8,047,605 | B2* | 11/2011 | Yamazaki | B60N 2/4228 297/216.1 |
| 2006/0255633 | A1* | 11/2006 | Nelson | B60N 2/42709 297/216.13 |
| 2012/0306256 | A1* | 12/2012 | Okuyama | B60N 2/5825 297/452.6 |
| 2013/0033084 | A1* | 2/2013 | Sei | B60N 2/5825 297/452.58 |
| 2013/0270878 | A1* | 10/2013 | Adachi | B60N 2/4228 297/216.14 |
| 2013/0270887 | A1* | 10/2013 | Matsumoto | B60N 2/4228 297/452.34 |
| 2013/0320744 | A1* | 12/2013 | Sakamoto | B60N 2/5825 297/452.58 |
| 2014/0015290 | A1 | 1/2014 | Saada | |
| 2014/0252822 | A1 | 9/2014 | Tejedor | |
| 2015/0251570 | A1* | 9/2015 | Matsumoto | B60N 2/4228 297/216.12 |
| 2015/0367943 | A1 | 12/2015 | Saada | |
| 2016/0046224 | A1 | 2/2016 | Saada | |

FOREIGN PATENT DOCUMENTS

| | | | |
|---|---|---|---|
| WO | 02/18204 A2 | 3/2002 | |
| WO | 2012/024159 A1 | 2/2012 | |
| WO | WO 2012086803 A1 * | 6/2012 | ........... B60N 2/4228 |
| WO | 2012/104248 A2 | 8/2012 | |
| WO | 2012/130809 A1 | 10/2012 | |

OTHER PUBLICATIONS

International Search Report issued in Application No. PCT/EP2014/055921 dated Jun. 27, 2014.
Written Opinion issued in Application No. PCT/EP2014/055921 dated Jun. 27, 2014.

* cited by examiner

VEHICLE SEAT BACKREST HAVING A WEAKENED AREA THAT IS ABLE TO TEAR

TECHNICAL FIELD

The present invention relates to the field of passenger transport, among other public transport, in particular road, rail or air transport.

It relates more particularly to making a vehicle seat back provided to lessen the effects of a frontal shock of the vehicle on the body, and in particular the head, of a passenger located on a seat placed behind the seat back considered. The invention also relates to a vehicle seat including such a seat back.

PRIOR ART AND PROBLEM TO BE SOLVED

The volume and weight of vehicle seats are concerns which are addressed so as to decrease the transport environmental footprint, in particular in means of public transports. The decrease in the volume and weight does not have however to have an impact on the passenger's security.

In the air transport in particular, the reduction in volume and weight is exacerbated by the energy necessary for a given flight. Since security is an essential element, lightening strategies should be made without compromising the seat resistance. By reducing the unit volume of the seats, it is possible to decrease the spacing between two seats rows and to increase the number of passengers that can seat down within the aircrafts or, reversely, to increase the space assigned to each passenger. A better filling of the aircraft enables, at a constant passenger flow on an airline, the number of flights to be decreased. Likewise, since the reduction in the unit weight of the seats restricts the energy necessary for a given flight, the fuel necessary for these flights is thereby saved, which reduces the greenhouse gas emissions accordingly.

The dampening of most current aircraft seats is based on a deformation of the seat back. The passenger located behind a given seat back comes to hit the back of the seat located in front of him/her, during a violent frontal crash. The rigid structure of said seat back is folded during the shock, thus restricting the back shock of the passenger's head.

For example, patent WO/2012/024159 shows a mechanism for slanting an aircraft seat back. In case of a crash, the hinge between the seat back and the seating is broken, and the seat back comes to rock forwardly.

Patent EP1719701 suggests as an energy absorption the use of a hydraulic or pneumatic jack in the case of an aircraft security seat. In case of a crash, the shock is dampened by the jack, via a fluid friction.

Patent WO2002018204 suggests as an energy absorbing means the use of a spring, one end being attached to the plane structure, and another to the seat bracket. In case of a crash, the spring enables the passenger's movements to be dampened by elastic deformation.

The international application WO 2012/104248 discloses an ultra-light aircraft seat, having relatively small overall space and weight, while allowing passenger comfort, in particular at the seating and seat back. With reference to FIG. 1, an exemplary structure 1 for forming a set of three seats is represented. The structure 1 consists of several tubular elements 1A, 1B, 1C, 1F, and 1G, assembled to each other by different junction parts 2A, 2B, 2C, 2D. It is thus noted that empty spaces are provided at the seatings and backs of the three seats, for fabrics to extend between the tubular elements and make up the functional elements of the seats.

On the other hand, the passenger security should be ensured in case of a violent, in particular frontal, shock of the aircraft, for example in case of a crash. In the case of the structure 1, described in FIG. 1, the seat back does not fold during a shock, since the structure 1 is not deformable. On the other hand, as described in international application WO 2012/130809, the use of an energy absorbing fabric tensioned between the tubular elements 1A, 1B, 1C, 1F, and 1G of the structure 1 enables the shock energy to be absorbed by gradually slowing down the passenger.

FIG. 2 shows an exemplary embodiment of a set of two rows 4 of three seats according to prior art. During a frontal shock, each passenger 6 is hurled to the front, against the rear of the seat back 3 of the seat placed in front of him/her. The seat backs 3, made of energy absorbing fabrics, tensioned in the middle of the structure 1, are thus deformed and absorb the shock energy, by gradually slowing down the passenger 6, in particular his/her head.

But, the textile making up the centre part of the seat back 3 is elastically deformed and transmits strains at the seat structure 1, at the seat back. If this structure 1 has, at the seat back, an ergonomic shape including alternately concave and convex curves, these strains can lead to a rupture of the material, for example a composite, making up the structure 1, at these curves.

Moreover, the use of a deformable fabric for dampening the shock may be an issue, in particular in terms of cost and comfort for the passenger seated on the seat. Consequently, it can be desirable to resort to the use of a little or not deformable fabric, in order to be capable of offering a tailored coating to the customer, by using for example various decorative fabrics but the mechanical properties of which are lower than those of technical fabrics.

The main purpose of the invention is to provide a seat enabling the entire weight and volume to be restricted, while ensuring the passenger security.

SUMMARY OF THE INVENTION

One concept of the invention is to dampen a passenger hurled against the rear of a seat during a crash using a textile. For this, it is suggested to differently distribute the strains accumulated in the centre part of the seat back on the deformable fabric, and to transmit energy by other paths to the seat structure, at the seat back, in case of a crash of the vehicle.

The main object of the invention is thus a vehicle seat back including:
  a seat structure defining at least partially the seat back,
  a textile assembly attached to the seat structure.

According to the invention, the textile assembly includes at least one embrittled linear zone between at least two portions of the textile assembly, the seat back being designed such that said at least one embrittled linear zone tears, during a shock on the textile assembly under accidental conditions, caused by the head of a passenger placed behind the seat back, to absorb at least partly the impact energy of the shock, in particular during accidental conditions of the vehicle.

The seat structure can be a framework including, at least in its part defining at least partially the seat back, an empty space.

The textile assembly can be superimposed at least partially to the empty space.

In a contemplated embodiment of the seat back according to the invention, said at least one embrittled linear zone is only able to tear during a shock having an impact force higher than 10 N/cm$^2$, or better 30 N/cm$^2$: this value has the purpose not to trigger the opening of the embrittled textile zone under normal operating conditions of the seat. In particular, during turbulences in the means of transport, a passenger pressing against the seat back to be stabilized should not open the embrittled zone. This value however does not have to be too high, such that it can be opened in case of an accident at low enough pressures in order not to put the dampened passenger at risk.

In another contemplated embodiment of the seat back according to the invention, said at least one embrittled linear zone includes at least one of the following embrittlement means: a seam, a reversible hook and loop tape, a set of snap fasteners, even punctures, and a zip fastener, inter alia.

Preferably, the tear strength of said at least one embrittled linear zone is made increasing on at least one part of said at least one embrittled linear zone by adding at least one further embrittlement means, in particular by adding further seams. Thus, an increasing concentration of the embrittlement means can be achieved.

In a particular embodiment of the seat back according to the invention, said at least one embrittled linear zone defines a window in the centre zone of the textile assembly with a partially embrittled contour at the high and side parts of the textile assembly, so as to enable the window to be gradually torn from top to bottom under the effect of the shock.

In another particular embodiment of the seat back according to the invention, said at least one embrittled linear zone consists of at least two embrittled linear zones parallel to each other, located in particular in the centre part of the textile assembly.

In another particular embodiment of the seat back according to the invention, said at least one embrittled linear zone consists of at least two embrittled linear zones, intersecting at a crossing point located in the centre part of the textile assembly.

In this case, it may be turn out to be advantageous that said at least two embrittled linear zones include an increasing number of embrittled parallel lines in the direction moving away from the crossing point.

Said at least one embrittled linear zone can further be designed such that, after tearing, an aperture is achieved in the seat back, the textile assembly being mostly open.

An arrangement complementary to the seat back according to the invention provides that the textile assembly is only to be torn, outside said at least one embrittled linear zone, during a shock having an impact force higher than 10 N/cm$^2$, or better 30 N/cm$^2$ for the previously set forth reasons.

Said linear zone is advantageously able to tear firstly during a shock.

A second main object of the invention is a vehicle seat characterised in that it includes a vehicle seat back as defined previously.

The seat structure can define at least partially the seat's back and seating.

A third main object of the invention is a method for manufacturing a seat as previously defined, comprising the phase of locating said at least one embrittled linear zone of the textile assembly and/or the shape of said at least one embrittled linear zone as a function of characteristics of the seat structure and/or the impact conditions, during a shock.

LIST OF THE FIGURES

The invention and its different technical characteristics will be better understood upon reading the following detailed description, with several examples of implementations not restricting the same, as well as upon examining the schematic partial figures, in which.

DETAILED DESCRIPTION OF SEVERAL EMBODIMENTS OF THE INVENTION

The term "seat back" is used in the present description to designate the upper centre part of a seat against which a passenger presses, through his/her back, and having a rear face facing a passenger seated on the seat placed behind the seat considered. The seat back thus consists of a seat structure and a textile assembly placed in the middle of the upper part of the seat structure.

Figure 1:
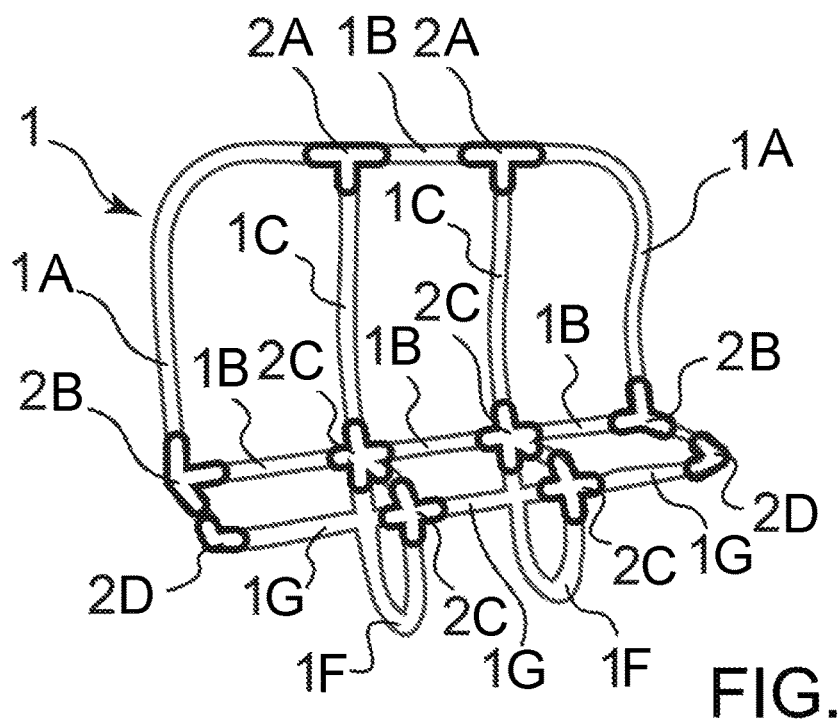
FIG. 1 shows, in a perspective view, a seat structure of a seat back according to the invention.
Figure 2:
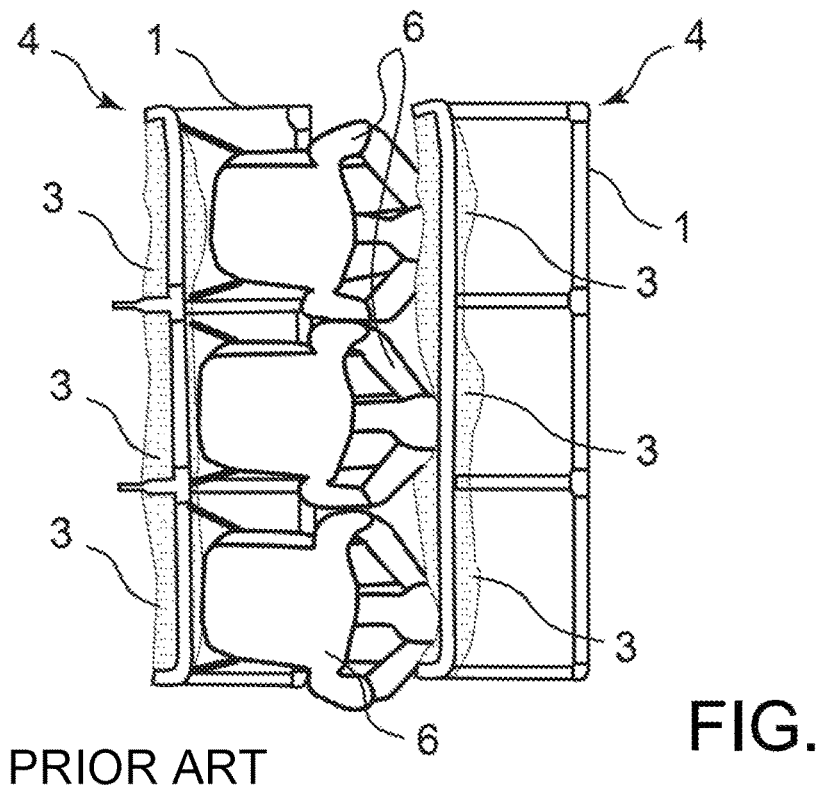
FIG. 2 shows, in a perspective view, a set of seats of prior art.

Considering the aircraft seats as described by FIG. 2, the seat according to the invention is based on a concept consisting in attempting to avoid the stress concentrations at the curves of the seat back structure, during a frontal shock of the aircraft, and, consequently, when the passenger's head located behind the seat considered is hurled. It is thus suggested to use a textile material to make up the seat back, and the geometry of which may change beyond some stress threshold. Indeed, it is noted that the elastic deformation of the textile assembly induces significant and lengthy strains in the seat structure, at the seat back, during a frontal crash of the plane. This seat structure cannot resist accordingly.

Thus, it has been chosen to design a textile assembly being elastically deformed, in particular by the fact that it can be broken at some places determined beforehand, when the force exerted on this textile assembly exceeds a predetermined threshold. From this perspective, the seat back according to the invention has two conformations. The normal conformation, that is when the seat is used, enables the passenger to be comfortably seated. The conformation after some force threshold on the seat back is exceeded, for example during a crash, enables the passenger to be consequently dampened, and in particular his/her head without rupturing the seat back structure.

To achieve this geometry change, it is suggested to integrate to the textile one or more embrittled linear zones which can be ruptured beyond a predetermined stress. Different techniques and technologies have been developed to make such embrittled linear zones, for example a reversible hook and loop tape, a seam or snap fasteners. Point punctures on line with the textile assembly, such as dotted lines could even be contemplated. Thus, these technologies enable at least two parts of the textile assembly to be made integral, as long as the stress exerted on the same does not exceed the predetermined limit. Beyond this stress, the textile assembly breaks. In other words, the reversible hook and loop tape or the snap fasteners are opened, or the seams tear. The textile assembly thus has a completely modified mechanical structure and the transmission paths of the strains to the seat structure are modified.

The embrittled linear zone(s) is (are) of a lesser resistance than the rest of the textile assembly and will preferentially tear in case of an impact on the textile.

Figure 3A:
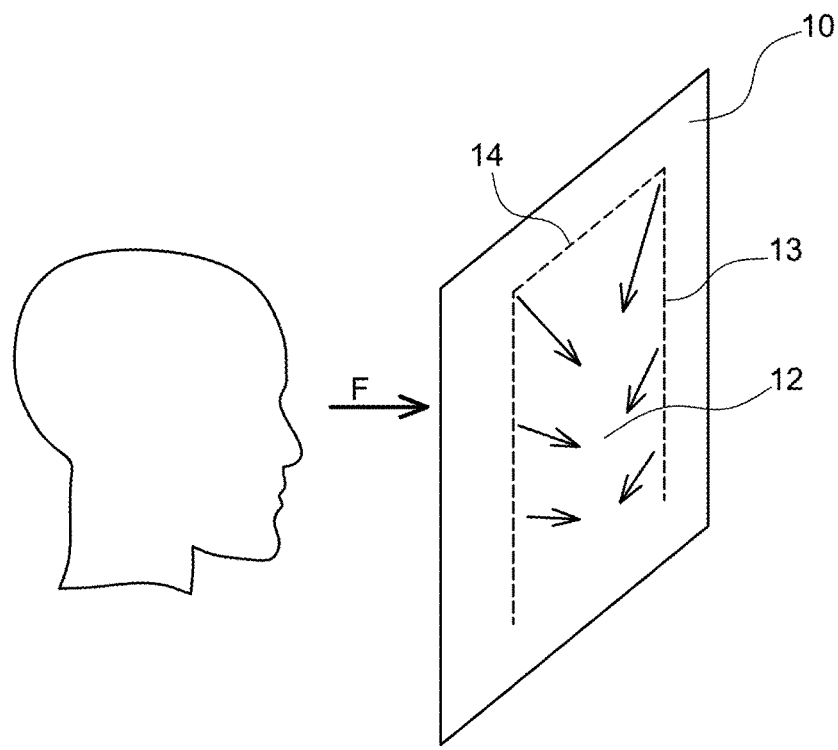
FIGS. 3A and 3B show a first implementation of the seat back according to the invention.
Figure 3B:
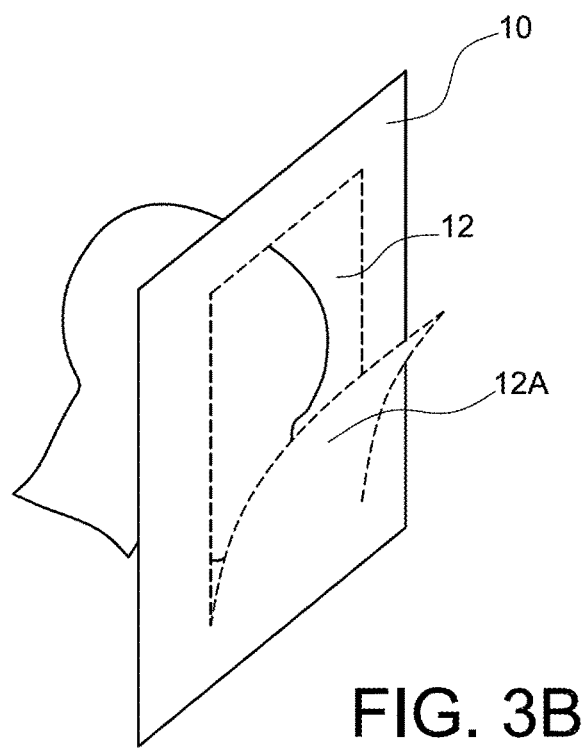

With reference to FIGS. 3A and 3B, a first solution to avoid to transmit strains to the curves of the seat back structure consists in providing a window 12 in the centre part of the textile assembly 10 making up the centre of the seat back according to the invention. This window 12 thus consists, in this embodiment, of two vertical embrittled linear zones 13 joined, at their upper end, by a horizontal embrittled linear zone 14. Only the lower part of the window 12 is not concerned by an embrittled linear zone. As shown in FIG. 3B, in case of a crash of the aircraft in which the seat according to the invention is placed, the three embrittled linear zones, that is the two vertical embrittled linear zones 13 and the horizontal embrittled linear zone 14 break off. The centre part consisting of the window 12 tears and breaks away to become a broken away window 12A with respect to the rest of the textile assembly 10. Thus, the forces transmitted by the head of the passenger located behind the seat considered causes this tearing and are not transmitted to the edge of the textile assembly 10 and thus, consequently, to the seat structure, at the seat back. After having passed through the window thus created, the head of the passenger is dampened by his/her safety belt which holds the body bottom on the seat from behind. This can allow to avoid that the passenger hits too violently, through his/her head, the bottom of the window 12. It is reminded that the elasticity of the textile assembly, until the embrittled linear zones are ruptured, dissipates part of the energy from the head hitting the seat back.

Figure 4:
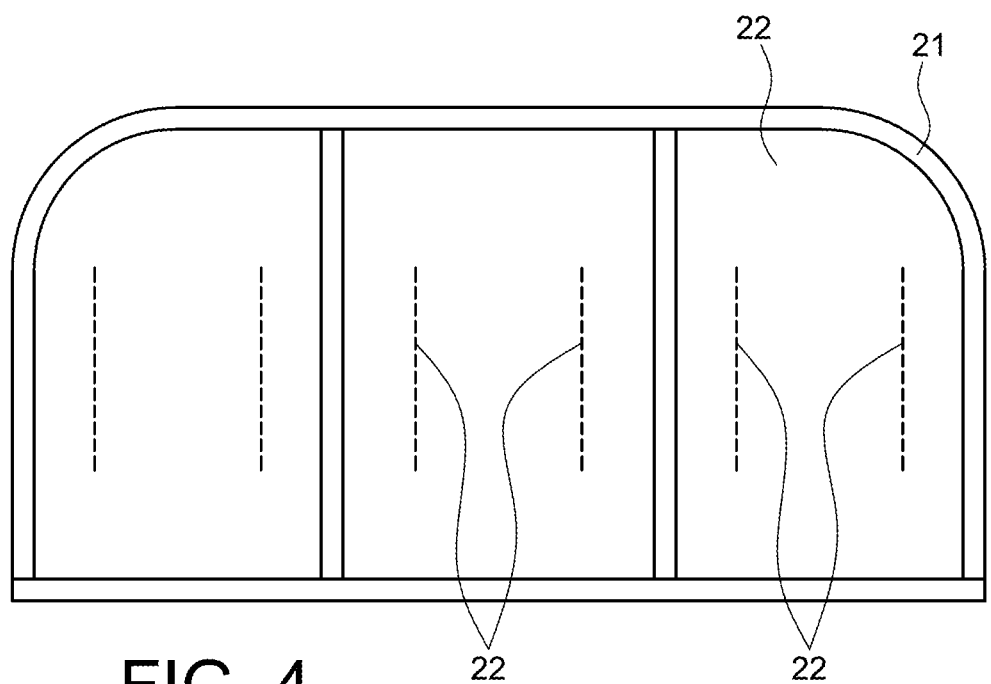
FIG. 4 shows a second implementation of the seat back according to the invention.

FIG. 4 represents the upper part of a three-passenger seat including a seat structure 21 inside which three textile assemblies 20 each making up the seat back of a passenger are placed. In the middle of each woven element, there are two vertical embrittled linear zones 22 parallel to each other and defining a centre part in the middle of which the head of the passenger located on the seat from behind comes to rock, during a shock due to a crash of the aircraft. These embrittled linear zones 22 are thus tearable.

Figure 5A:
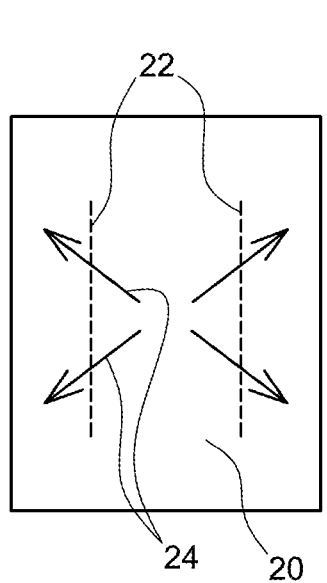
FIGS. 5A and 5B show the operation of the embodiment described by FIG. 4.
Figure 5B:
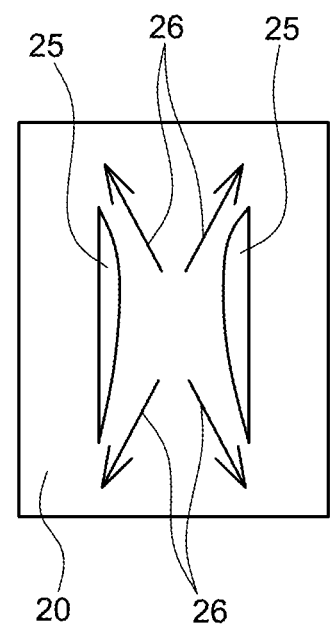

To explain the phenomenon of force distribution change on the textile assembly, FIGS. 5A and 5B should be referred to.

Indeed, FIG. 5A shows the distribution of the forces 24, due to the impact of the shock of the passenger's head located behind the seat considered, very probably in the middle of the textile assembly 20 between both vertical embrittled linear zones 22. These forces 24 are thus directed rather sideways. Consequently, they are the vertical posts of the structure making up the seat which will be biased at the beginning of the impact of the passenger's head striking the textile assembly 20.

Referring to FIG. 5B, from a predetermined pressure, both vertical embrittled linear zones 22 break off and begin to open to form apertures 25. The arrows 26 thus show the new orientation of the forces applied to the textile assembly 20. These forces are thus rather of a vertical orientation and transfer to the lower and upper parts of the structure making up the seat at the seat back. Consequently, the bending stresses on the vertical posts of the structure, at the beginning of the impact (FIG. 5A) are transformed into compression stresses. The strength of the material, for example a composite material, making up the seat structure, can be much higher in compression than in bending or shearing, therefore there should be no fear about a possible damage to the seat structure, at the seat back. The change in the force orientation in a direction more favourable to the strength of the seat back structure thus enables to enhance the strength during the seat impact.

In this case, it is contemplated to add a small fabric web more deformable than the fabric making up the textile assembly and placed along the embrittled linear zones to restrict the gap between both torn edges.

However, it is often advantageous that said at least one embrittled linear zone is designed such that, after it is torn, an aperture is achieved in the textile assembly.

Figure 6A:
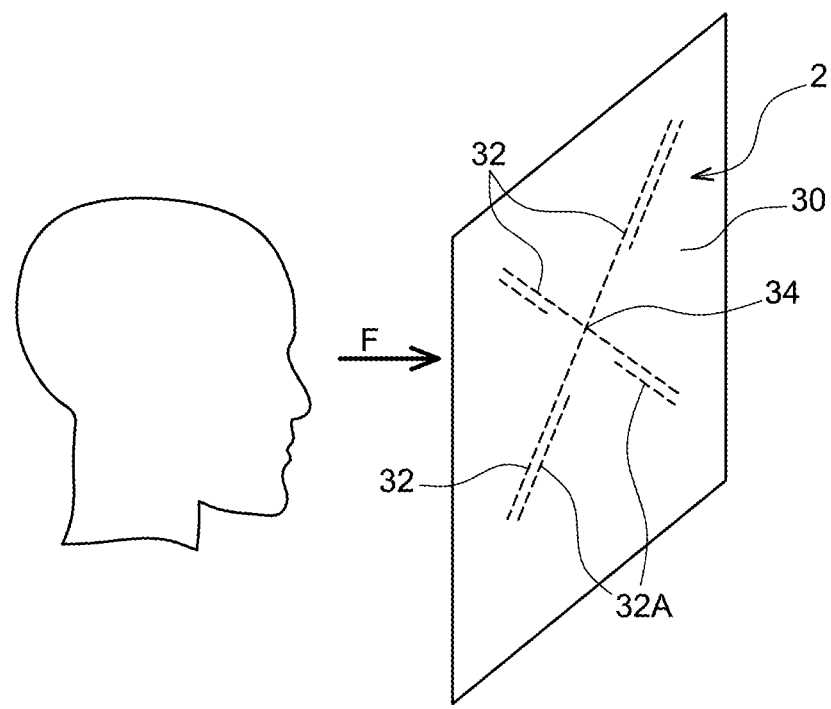
FIGS. 6A and 6B show a third embodiment of the seat back according to the invention.
Figure 6B:
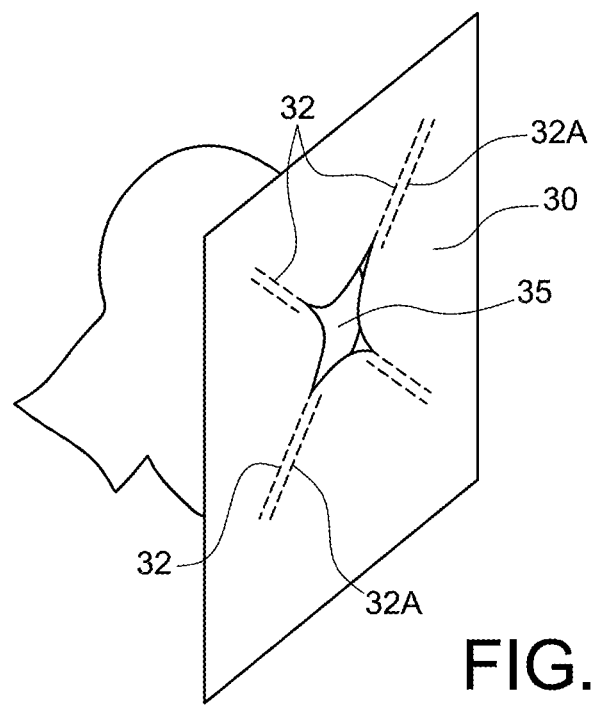

With reference to FIGS. 6A and 6B, it can be contemplated to locate the point of the shock of a passenger's head on the rear face of the seat back placed in front of him, by working on the shock kinematics thinking that this shock approximately occurs in the centre of the textile assembly 30, the embrittled linear zones can consist of two intersected linear zones 32 intersecting or crossing each other at a crossing point 34 relatively central with respect to textile assembly 30. Moreover, it is possible to double or triple the embrittled linear zones 32 as one of these linear zones 32 are travelled starting from the centre 34 and moving away to the external edges of the textile assembly 30. Thus, the tear strength of this embrittled linear zones 32 is enhanced by adding at least one further embrittled linear zone 32A as a hole 35 is formed (see FIG. 6B) corresponding to the crossing point 34 of FIG. 6A. In other words, the head of the passenger located on the seat from behind hits the centre of the textile assembly 30, to the crossing point 34 and initiates the opening of the embrittled linear zones made up by the two intersecting linear zones 32. The extension of this open zone is thus made more difficult by doubling or tripling the seams or other embrittlement means. The passenger's head retaining force is thus relatively constant for the entire shock.

It is set forth that, in several cases, tearing the embrittled linear zone(s) causes a significant opening in the seat back, at least in its rear face in the case where the seat back has some thickness, due to the presence of elements other than the textile assembly, in particular on its front face.

Making all these embrittled linear zones can be achieved in several ways.

A first one is the use of "scratch" or "Velcro®"-type reversible hook and loop tape. In this case, the breaking stress is typically in the order of 10 N/cm². This can be made by stitching a male web on the side of the slot and a female web on the other side. However, the repeated opening and closing of this reversible hook and loop tape should not decrease the breaking strength and make, step by step, the slots more and more sensitive.

A second possibility to make these embrittled linear zones is the use of seams dimensioned to break off at a predetermined stress. This dimensioning takes into account the type of thread used as well as the stitch count per seam centimeter. A typical dimensioning is to use a polyester thread with a simple line stitch with three stitches per centimeter. Several stitches can be made side by side, as represented in FIGS. 6A and 6B, to enhance, from a determined place, the embrittled linear zone. It is also possible to use a second hook and loop tape to enhance the pull-out resistance in the previous case.

A third embodiment consists in using snap fasteners. To enhance the tear strength, the placement frequency of the snap fasteners is enhanced as the crossing point moves away, in the case of the embodiment described by FIGS. 6A and 6B.

A fourth embodiment consists in making even and aligned punctures on the textile. These punctures orient the textile tear in the chosen direction, and their spacing enables the force required for opening and then propagating the tear to be controlled.

A fifth embodiment consists in using zip fasteners defining the zone that can be opened, the resistance of the zip fastener enabling the force to be applied to initiate tear to be dimensioned.

The object of these embrittled linear zones made by tearable slots is that they are used only in case of a shock. In the case of a normal operation, these embrittled linear zones must not be biased and the slots do not have to be opened. Consequently, a 70 kg passenger pressing against the rear face of the seat back should not risk to tear the textile assembly of the seat back. The latter has to resist to a 700 N force evenly distributed on the textile assembly of the seat back. In the case of the window 12 as represented by FIGS. 3A and 3B, the angles defined by the embrittled linear zones are more fragile than the rest of the textile assembly. A 700 N (70 kg) force distributed on a 5 cm-diameter circle (about 9 N/cm$^2$), for example a passenger's hand pressing thereagainst, does not tear the angle of the window.

What is claimed is:

1. An aircraft seat back including:
 a seat structure defining at least partly the seat back,
 a textile assembly attached to the seat structure and including at least one embrittled linear zone between at least two portions of the textile assembly,
 wherein said at least one embrittled linear zone consists of at least two embrittled linear zones intersecting at a crossing point in a center part of the textile assembly, such that said at least one embrittled linear zone tears, during a shock on the textile assembly under accidental conditions, caused by the head of a passenger placed behind the seat back, to absorb at least partly the impact energy of the shock.

2. The seat back according to claim 1, wherein the seat structure is a framework including at least in its part defining at least partly the seat back an empty space, and in that the textile assembly is superimposed at least partially to the empty space.

3. The seat back according to claim 1, wherein said at least one embrittled linear zone is only able to tear during a shock of an impact force higher than 10 N/cm2.

4. The seat back according to claim 1, wherein said at least one embrittled linear zone includes at least one of the following embrittlement means: a seam, a reversible hook and loop tape, a set of snap fasteners, even punctures, and a zip fastener.

5. The seat back according to claim 4, wherein the tear strength of said at least one embrittled linear zone is made increasing on at least one part of said at least one embrittled linear zone by adding at least one further embrittlement means.

6. The seat back according to claim 1, wherein said at least one embrittled linear zone defines a window in the center part of the textile assembly with a partially embrittled contour at a high part and at a side part of the textile assembly, so as to enable the window to be gradually torn from top to bottom under the effect of the shock.

7. The seat back according to claim 1, wherein said at least one embrittled linear zone further comprises at least two embrittled linear zones parallel to each other, located in the centre part of the textile assembly.

8. The seat back according to claim 1, wherein said at least one embrittled linear zone is designed such that, after tearing, an aperture is achieved in the seat back, the textile assembly being open.

9. An aircraft seat, wherein it includes an aircraft seat back according to claim 1, the seat structure defining at least partially the seat back and a seating.

10. The seat back according to claim 1, wherein the impact energy of the shock results from accidental conditions of the aircraft.

11. The seat back according to claim 5, wherein the further embrittlement means is an additional seam.

\* \* \* \* \*